United States Patent [19]

Casler et al.

[11] Patent Number: 4,636,107

[45] Date of Patent: Jan. 13, 1987

[54] REFORMED IN PLACE RESILIENT RETENTION SPRINGS

[75] Inventors: William A. Casler; Phillip E. Saurenman, both of Pasadena, Calif.

[73] Assignee: Plus Manufacturing Co., Inc., South El Monte, Calif.

[21] Appl. No.: 363,468

[22] Filed: Mar. 30, 1982

[51] Int. Cl.$^4$ .............................. B25G 3/00; F16D 1/00
[52] U.S. Cl. ............................... 403/405.1; 403/329; 310/154; 267/164; 29/596
[58] Field of Search ............... 310/154; 411/517, 518, 411/519, 547; 403/372, 329, 326, 405; 267/164, 159, 158; 29/596, 522 R

[56] References Cited

U.S. PATENT DOCUMENTS

| 1,958,154 | 5/1934 | Six | 267/164 X |
| 2,513,227 | 6/1950 | Wylie | 310/154 |
| 2,776,735 | 1/1957 | Bancroft | 403/405 X |
| 3,090,877 | 5/1963 | Baumhart | 310/154 |
| 3,091,713 | 5/1963 | Latta | 310/154 |
| 3,258,622 | 6/1966 | Gillespie | 310/154 |
| 3,631,277 | 12/1971 | Ferdig | 310/154 |
| 3,807,040 | 4/1974 | Otto | 29/522 X |
| 4,412,145 | 10/1983 | Voss et al. | 310/154 |

FOREIGN PATENT DOCUMENTS

| 2735778 | 3/1979 | Fed. Rep. of Germany | 310/154 |
| 2269229 | 11/1975 | France | 310/154 |
| 1477878 | 6/1977 | United Kingdom |
| 1480136 | 7/1977 | United Kingdom |
| 2005367 | 4/1979 | United Kingdom |

Primary Examiner—Andrew V. Kundrat
Attorney, Agent, or Firm—Donald D. Mon

[57] ABSTRACT

Secure and rapid assembly of magnets or other articles in tubular or other-shaped housings is achieved with bow type compression retainers which are made from reformable spring metal, and are initially formed shorter and higher than their ultimate working dimensions to permit loose or easy manual or automatic assembly in their final working location, after which the retainers can be reformed in place to a reduced height and extended length so as to take up any clearance and to place an initial load on abutting faces of the article to be secured. Then the bow shaped retainer is finally reworked in a comparatively small portion of its length, and in a direction which tends to change the natural curvature and extend the intrinsic unloaded length of the restrained bow, thus off-setting "spring back" type load losses characteristic of normal spring forming, and assuring maximum spring retention forces irrespective of large assembly tolerances and high spring rates. Provisions for metal curling or bending near the ends of the retainer can further extend tolerance take-up capabilities; and several preferred means are shown for accomplishing the final curvature-reversal loading of the retainers.

24 Claims, 18 Drawing Figures

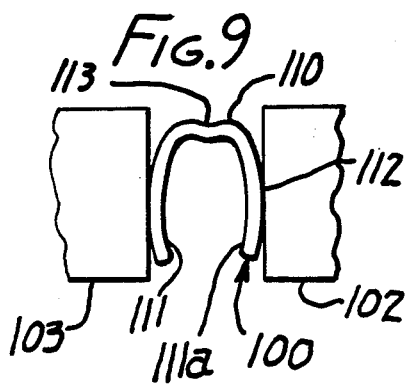
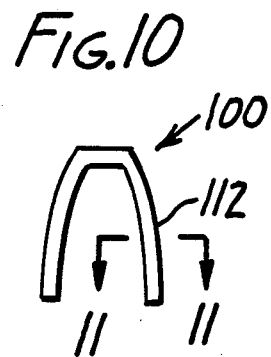
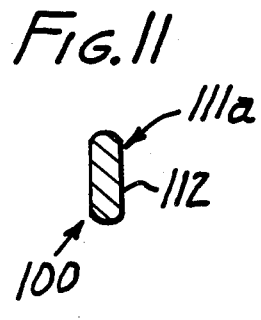
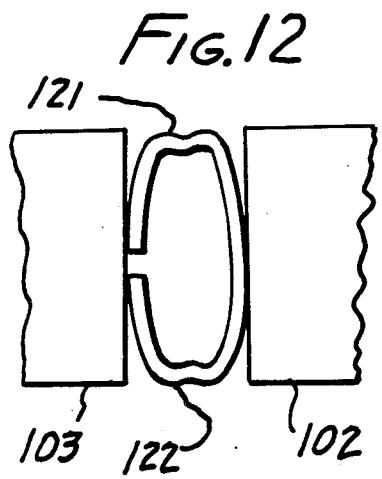
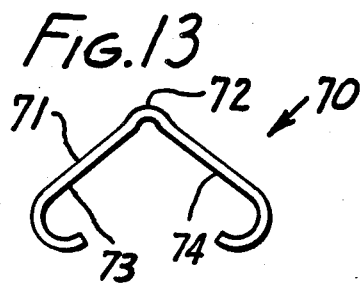
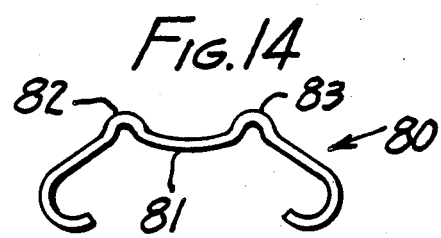
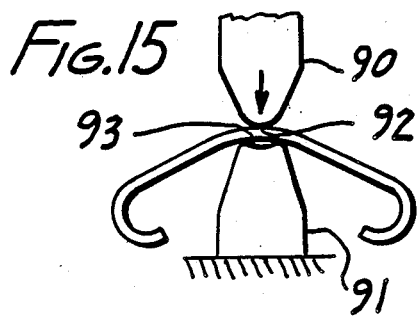
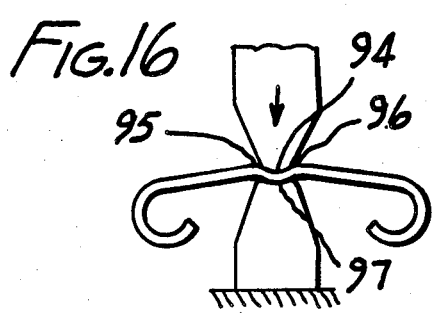

REFORMED IN PLACE RESILIENT RETENTION SPRINGS

FIELD OF THE INVENTION

This invention relates to the spring retention of assemblies of articles, for example the retention of curved ceramic permanent magnets to the inside wall of a steel motor housing ring.

BACKGROUND OF THE INVENTION

It is often desirable or necessary to retain equipment components without threading, piercing or otherwise re-working one of the components. Securing ceramic magnets in a steel housing ring for permanent magnet motors is one example. Spring retainer clips and adhesives are common means for accomplishing this objective.

Adhesive techniques and materials offer a wide variety of approaches for securing articles to one another. However, there are inherent disadvantages including the time required and the special equipment needed for curing the adhesive; the handling, mixing, applying, and cleaning up of the adhesive; and precautions against noxious or toxic effects. Further, the costs of special quick-drying adhesives and related special equipment, and the troubles of maintaining the necessary tight control of surface tolerances are often significant. To avoid these, sometimes assemblies are secured with the use of both an adhesive and retainer clips. The retainer clips may be removed after the adhesive has set, or they may be left in permanently, depending upon individual economic and structural considerations.

The use of spring retainers in lieu of adhesives is desirable, where practical. In some cases, the spring retainers—typically bow or wave-shaped flat metal compression springs—are pressed or snapped into their final loaded position. In other applications the springs and magnets are assembled loosely in a larger diameter fixture, after which the assembly is compressed radially, and then axially inserted into the cylindrical housing.

There are a number of problems which limit the use and effectiveness of the existing spring retainer approaches. Variations in the arc lengths of the articles to be retained, and in dimensions of other mating components, pose difficulties with respect to critical relationships between the retainer spring's relatively short length, and the requirements for both sizeable loads and large tolerance take-up capabilities. Closer control of tolerances entails higher costs. Also, the pre-compression, as well as the snap-in assembly operations often tend to break or chip ceramic magnets or other brittle articles. In some instances, spring retention systems have been avoided and even abandoned because of concern for unacceptable breakage, or for displacement from impacts during assembly, handling, shipping or use.

The need remains for a basically improved mechanical retention system which is adaptable to:
 a. large tolerance variations beyond the working length of ordinary springs;
 b. providing sizeable, and consistent holding forces without damaging magnets or other parts being retained; and
 c. easy and rapid manual or automatic assembly techniques (without contending with spring loads during assembly of components). The term "working" is sometimes used to describe the spring of this invention. It is in fact a spring which continues to exert a bias force adaptable both in compression and extension. The application of this force as retention means is merely one application, in which it resists cyclical vibratory forces and thermal expansion and compression as encountered in electrical motors, while still pressing against an article such as a magnet to hold it in place. Its movements are similar to those of an actuator.

BRIEF DESCRIPTION OF THE INVENTION

This invention addresses the above and other related needs with a resilient retainer structure and system which is reformed-in-place, i.e., a production-quality retainer with its tolerance variations is inserted into a system that can have significant tolerance variations, and is reformed-in-place to a new configuration which takes up small or large tolerance clearances as needed and then exerts a retentive force that is substantially independent of the tolerance take-up, and that provides essentially all of the force available with the yield strength of the retainer structure.

According to this invention, the retention spring is initially formed into a bow or a wave-shaped structure, whose extremities are short of their ultimately-intended working length. This enables rapid and easy placement in what will be its final working position. Then with special in-place re-forming tools and techniques, the ends of the "bow" or "wave" form retention springs are extended first adaptively to take up assembly clearance and tolerance variations, and then reformed further to "load" it in place. Limited intermediate sections of the retention spring are then permanently re-worked and reformed at apex points above the line between the working contacts at ends of the arms of the spring. This final re-working is limited to a relatively small portion of the spring's free length. In this limited area or areas the metal is permanently bent in a direction tending to open the bow curvature and thus to increase the intrinsic length of the spring and the bow-end forces against the next assemblies.

In effect, the spring is first only partially fabricated. It is made to an assembly length appreciably shorter than its working length. Then it is loosely assembled with the other parts, and reconfigured and loaded in place by the above methods. This reduces to insignificance the classical "spring-back" effects which tend to prohibit effective in-place loading of resilient members.

Large tolerances take-up capabilities are inherent in the reform techniques of this invention, and they can be further extended in preferred embodiments. The apex reforming technique itself can take up tolerances which are large in relation to the small working deflection lengths common in the comparatively short, stiff compression springs that are usually employed for assembly retention. Beyond this, curved or "wave" type segments at the ends of the spring can be configured so as to be compressed, and take a permanent set during the in-place, re-form operation, with the bow as a whole then taking its load-set during the final apex re-form process.

A preferred method for conveniently and uniformly taking up very large assembly tolerance variations is to curve the ends of the retainer arms to promote metal curling as the arms are extended during an initial compression of the apex and spreading of the arms of the retainer. During this initial reforming and spreading of the loosely assembled bow or wave spring the precurled ends of the spring slide on adjacent surfaces, and then engage the next articles at restraint angles which facilitate further curling of the ends in place, until the apex of the bow structure is deflected to its approximate working height—just prior to the final function of reconfiguration loading by local reforming, as previously described.

The above and other features of this invention will be fully understood from the following detailed description and the accompanying drawings, in which:

BRIEF DESCRIPTION OF THE DRAWINGS

FIG. 9 is a fragmentary view taken at line 9—9 in FIG. 6;

FIG. 10 is a side view of the initial shape of the retention spring of FIGS. 6 and 9;

FIG. 11 is a cross-section taken at line 11—11 in FIG. 10;

FIG. 12 is a view similar to FIG. 9 showing a variation thereof;

FIGS. 13 and 14 show variations of basic unreformed retention spring shapes;

FIGS. 15 and 16 show two sequential steps accomplished by preferred tooling;

DETAILED DESCRIPTION OF THE INVENTION

Figure 1:
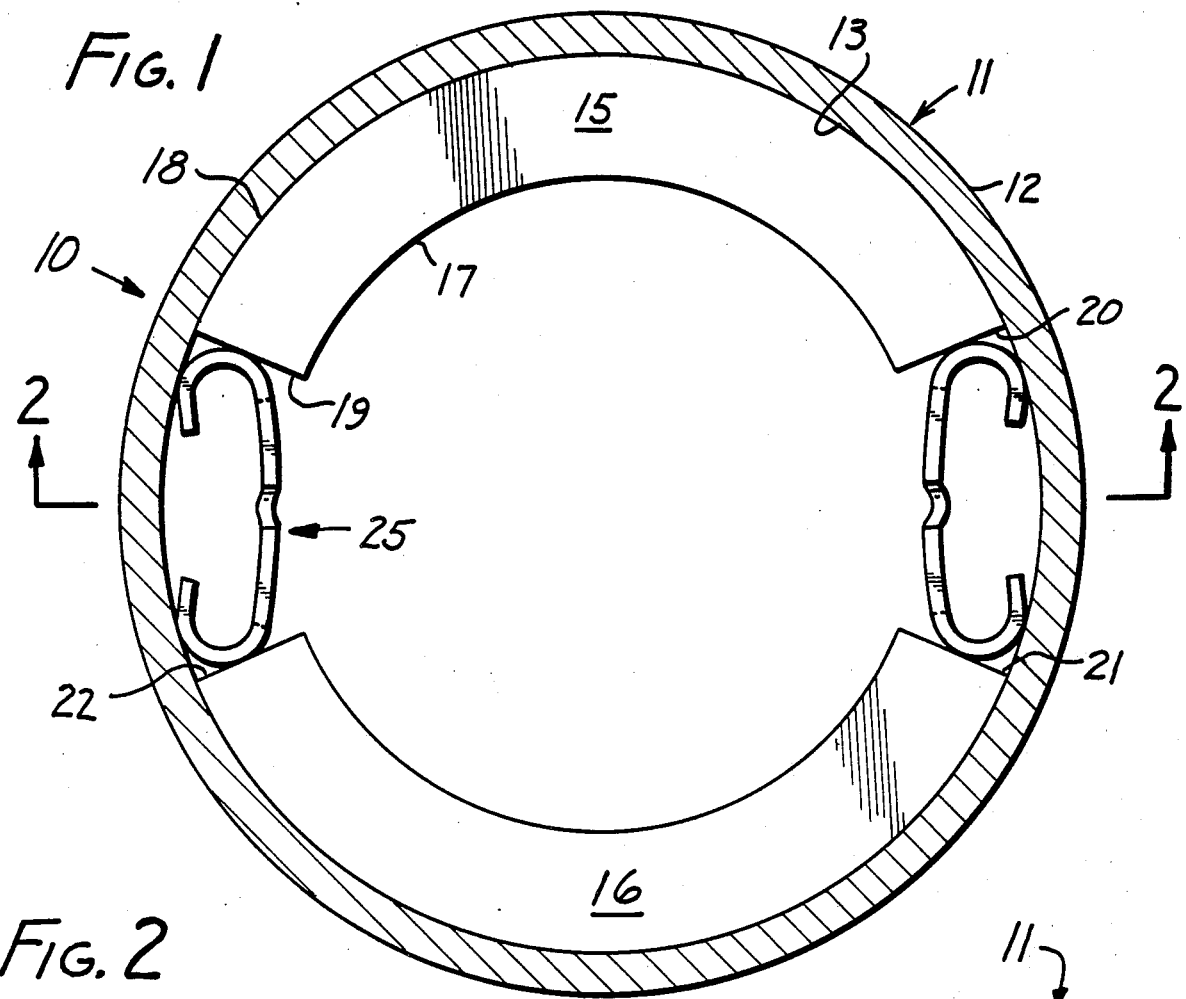
FIG. 1 is a cross section of the presently preferred embodiment of the invention taken at line 1—1 in FIG. 2.
Figure 2:
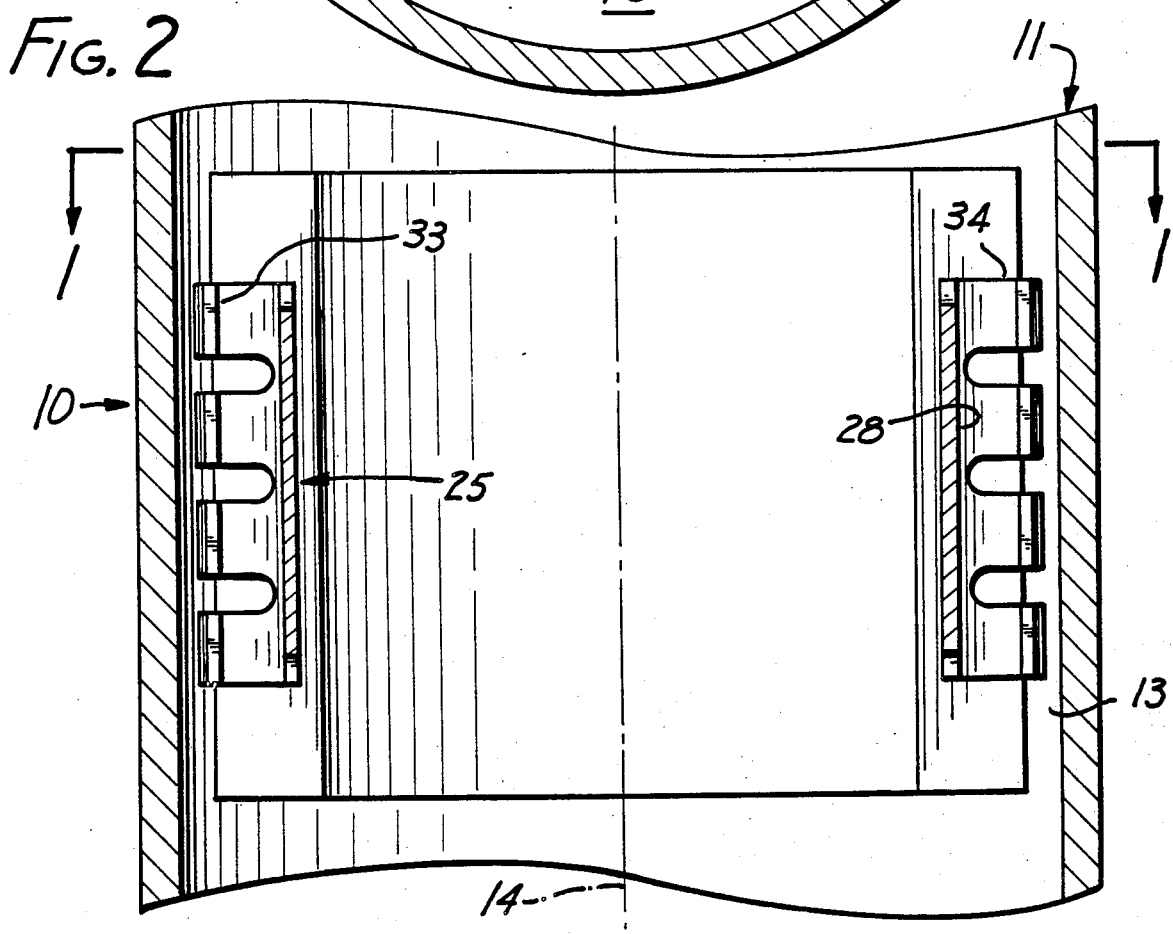
FIG. 2 is a cross section taken at line 2—2 in FIG. 1.

FIG. 1 shows a motor housing 10 which constitutes an important use for the instant invention. Such a housing includes a steel motor ring 11 which may be formed as a seamless tubing, or as a tubing formed with a seam. It has an outer wall 12, an inner wall 13, and a central axis 14. The inner wall is circularly curved.

It is customary for these motor rings to have attached to them a pair of permanent magnets 15, 16. Usually these are ceramic. The magnets have an inner surface 17 and an outer surface 18 whose curvature is the same as the inner wall, both being centered on the axis. The magnets include abutment surfaces 19, 20, 21, 22, one pair on each magnet. One face of each magnet faces another face on the other magnet. One of the objects of this invention is firmly to hold the permanent magnets in place against inner wall 13 so they do not slide along it or fall away from it. It is to be remembered that ceramic magnets are often quite brittle, and it is necessary that forces exerted on them not be exerted in such a manner or at such intensities as are likely to cause fracture of the magnet.

Figure 3:
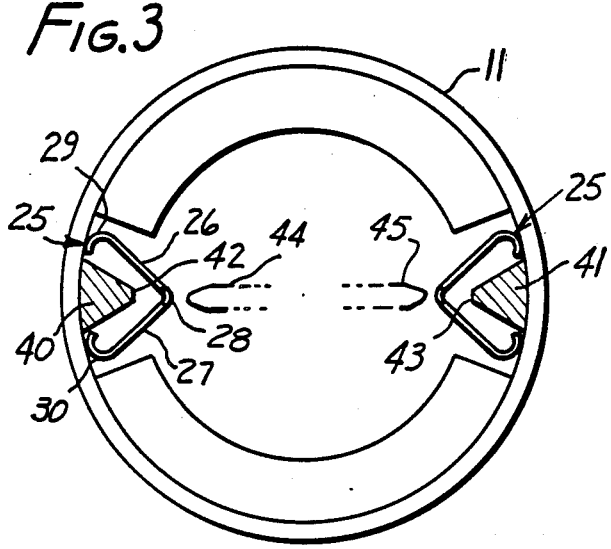
FIGS. 3, 4 and 5 are cross sections similar to FIG. 2 showing sequential steps in the installation of the detent.
Figure 7:
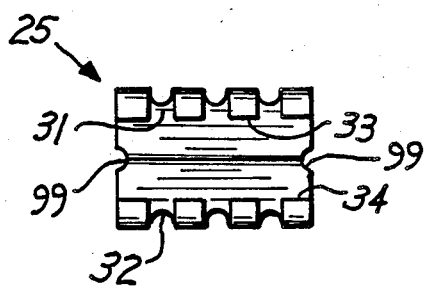
FIG. 7 is a bottom view of the presently preferred embodiment of the invention.
Figure 8:
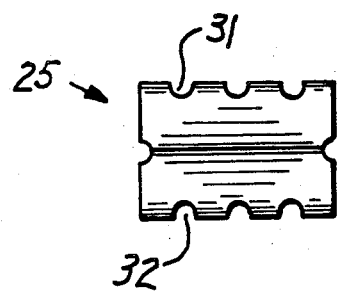
FIG. 8 is a top view of the presently preferred embodiment of the invention.

A retention spring 25 according to this invention is provided for holding the magnets in place. Magnets are given as an example of a use of this invention, and not as a limitation on the utility of invention. The initial, unreformed shape is best shown in FIGS. 3, 7 and 8. The retention spring is made of a metal such as carbon steel which has classic elastic stress-strain properties at lesser stresses, and an elastic limit above which permanent deformation occurs when greater stress is applied. This is to say that it inherently has a substantial spring-loaded capacity, and also that it can be permanently deformed.

The retention spring includes a pair of arm 26, 27 (FIG. 3) joined by an integral central apex or bight 28 which comprises a bend between the arms, thereby forming a dihedral angle between them. A convenient, and the presently-preferred, shape of the arms between their connecting bight and the points of contact with the next assembly, for example with the magnets and with the inside wall of the ring, is a substantially straight segment. In many preferred applications, at the free ends (the ends most distant from the apex or bight) both of the arms have a curvilinear surface 29, 30, respectively.

Surfaces 29 and 30 are formed as a curl in the metal. The metal is preferably slotted by slots 31, 32 to form a plurality of fingers 33, 34. These slots and fingers serve to distribute the pressure against the hard and potentially uneven surfaces of the magnet. However, the slots and fingers are optional depending on the unit forces to be applied by the curvilinear surface.

Significant design and construction features at the ends of the detent arms (whether they curl up or down, whether instead of curling during installation they are configured to bend to take up tolerance variations, whether they are simple arm extensions bowed into the magnet surfaces, and/or whether, and if so how the ends are slotted to adapt to uneven surfaces) are all pragmatic matters and will be determined by normal design and tests for optimum performance in each application. Persons skilled in the art will have no difficulty in designing correct configurations and dimensions for their individual installations. Suitable dimensions and specifications for a typical retainer spring to install in an inner wall with a diameter about 2⅞" diameter, permanent magnets about ⅜" thick and spaced apart at their ends by approximately 1" to 1 3/16" at their inner surfaces are as follows: stock thickness 0.030"; stock width 1¼"; spring height preformed 0.55"; spring height final formed (reformed) 0.25"; spring length preformed 0.95"; spring length final formed: without restraints 1 ¼"; with restraints 1" to 13/16". A suitable material is reformable spring steel.

The installation of this device requires permanent deformation of the body in such a way as to increase the spacing apart of the outer ends of the arms absent restraint ("intrinsic length"). Of course, the abutment surfaces are normally essentially immovable and therefore they do constitute a restraint.

One of the problems of spring retainers is that a high retention force requires a stiff, high-rate spring which is very sensitive to dimensional tolerances. In order for such a spring to exert a suitable separative force, it ordinarily must itself be compressed and allowed to spring back against the abutment surfaces. Also, the effective spring force is quite sensitive to the spacing between the abutment faces and to the accuracy of the dimensions of the spring itself. It should also be remembered that in permanent magnet motor assemblies an increase of spacing between one pair of adjacent abutment faces decreases the spacing between the other pair, so that one spring might be installed too tightly and another one too loosely. An advantage of this invention is that it enables the springs to be formed in place and stressed correctly in accordance with the actual existing, not a theoretical, spacing between the abutment faces.

The magnets are installed while holding them as closely to a symmetrical installation as is reasonably possible along with the use of high rate assembly tooling. A pair of lower anvils 40, 41 are located axially along the inner wall, and have forming surfaces 42, 43, respectively, which are flat (FIGS. 3–5) or slightly concave (see FIGS. 15 and 16). A pair of upper anvils 44, 45 are provided to move radially as shown by arrows 46 in FIG. 4, and preferably will have a convex surface. The terms "upper" and "lower" for convenience relate only to the side of the spring the respective anvil is placed on. The relationship to the vertical is not material.

A retention spring is placed between each of the facing abutment surfaces, and it will be noted that there can be, and usually there will be, a loose fit. The retention spring need not be compressed in order to set it between the abutment faces. Most conveniently, it will be inserted from the end, and need not clear inner corners 47, 48. In any event, it can form a loose fit relative to its adjacent abutment faces, thereby illustrating the freedom of this device from close tolerance constraints in the course of assembly.

In the next step of installation, the anvils are moved to contact the center of the retainer apex or bight, and this forces the fingers outwardly and sidewardly so as to contact both the inner wall of the ring and the respective abutment face. This takes up the tolerances in the system. The anvils continue to move the retainer apexes toward, but not beyond lines drawn between the points of contact with the abutment surfaces. This further movement causes the arms to bow, i.e., bend convexly away from the wall of the ring. This bowing deformation is at least partially temporary because if released there would be spring back even though some permanent deformation also results. Thus, even though the retention spring has at this stage been deflected to take up tolerances and apply load to the magnets and ring assembly, if it were released there would be substantial spring back, and an optimally reliable assembly would not be produced. To avoid spring back and to assure maximum retention forces on the magnet assembly, the final spring reforming stage is a permanent re-working of a localized region or regions which has the effect of reversing or opening the bow curvature and thus increasing the lateral spring load.

Figure 4:
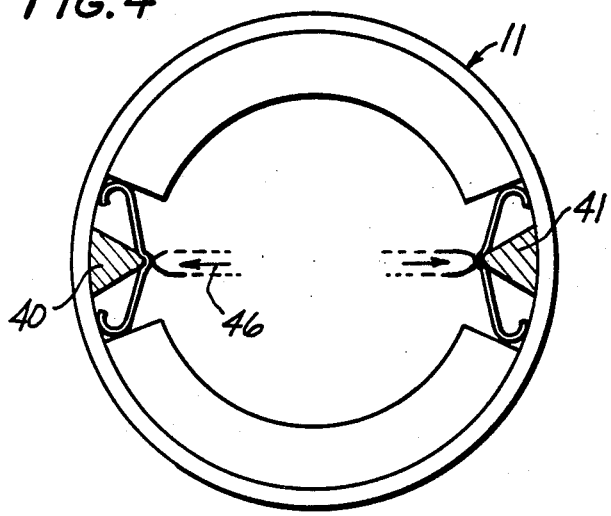
Figure 5:
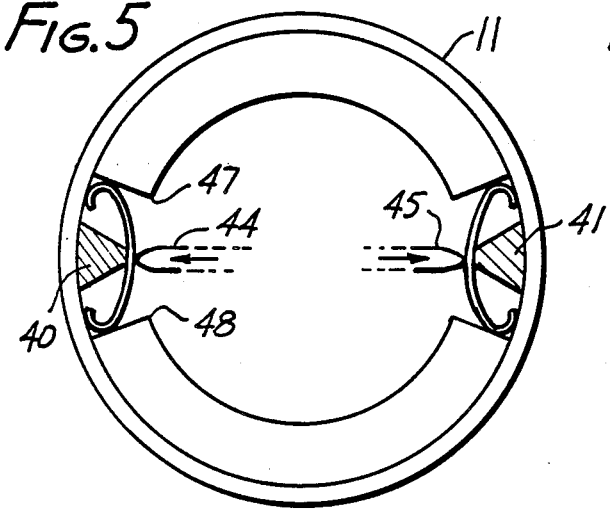

The initial spread of the arms, and the bowing action are shown in FIG. 4. Because of the properties of the metal, the angular bight or apex in this configuration does not simply open like a book. Instead, the arms spread and bow slightly and after taking up clearances, the fingers yield as necessary to relieve excessive localized forces on the abutting surfaces. A "peak" 28a, which is exaggerated in FIG. 4 remains. Even if not so pronounced, it still is a raised, rounded local region. When anvils 44 and 45 finally close they rework and permanently change the curvature of the bight in the localized area, so as to cause the dihedral angle between the arms to increase, thus further bowing the balance of the length of arms- causing bending stresses at least close to, and preferably beyond the yield point. The increases in the bow stresses of the arms increases the separative forces at the ends of the arms.

This reformation in place has occurred after the retention spring has taken up the tolerances and received an initial bowing spring tension. However variable these may have been, there is enough movement left as the consequence of the final permanent deformation to provide in a given retainer structure close to maximum separative forces irrespective of relatively large variations in assembled length. Spring-back unloading is slight because it is limited to the small portion of the bow retainer which is reworked between anvils 44 and 45. Thus, a reliable and suitable predictable spring load is generated in the retention spring after it is placed in its working position.

The rather easier bending of the fingers permits readier adaption of shape of the permanently deformed detent over a broader range of tolerances of parts and their installation. it is evident that the force exerted by the inner anvil has caused a permanent deformation by virtue of having stressed the metal at a stress level in excess of its elastic limit. FIG. 4 illustrates that the geometry of the anvil surfaces and of the bight is such that a change of shape in the sense of changing the bend can readily occur.

The anvils are now separated and the tool assembly slid out—the slight spring-back of the retention spring permitting ready removal of the tools.

It will be observed that this installation has been caused by a simple application of force between upper and lower anvils creating a retention system which is entirely related to each specific installation rather than to theoretical dimensions.

There are important possible variations to the simplest embodiment shown in FIGS. 1–5, 7 and 8. For example, a retention spring 70 is shown in FIG. 13 which has all of the features and the same general construction as retention spring 25. It differs in that its bight 71 has a rounded apex 72 which makes more pronounced the spreading and bowing of the arms 73, 74 when the apex is flattened against the anvil.

FIG. 14 shows a retention spring 80 whose bight 81 is more complex. It has a dimension of width, and includes two apexes 82, 83 similar to apex 72. This construction is useful when longer separations are to be spanned. Two sets of anvils are used, one for each of the apexes. Apart from the plurality of apexes, and differences in dimensions retention spring 80 is in all respects similar to spring 25.

FIGS. 15 and 16 show preferred tooling. A moving upper anvil 90 and fixed lower anvil 91 are provided as before. However, anvil 90 has a curved nose 92, and anvil 91 has a concave forming face 93 with a recessed central portion 94 and a peak 95, 96 on each side of it. FIG. 15 shows the tooling at the end of the first step- it has expanded the retention spring to take up the tolerances and made the initial bowing.

FIG. 16 shows the final step, and here the moving anvil has travelled the full distance and formed in a limited length of the bow a concave shape 97 at the bight. Thus, the central region has had an even more profound change of curvature to spread the arms than if the lower anvil were flat.

Centering notches 99 are optionally formed in the edges of the bight. These or other provisions such as a single hole can be engaged by tooling to hold the spring centered during the setting so as not to drift off excessively to one side or the other.

FIGS. 6 and 9–12 illustrate that the bight of the retainer spring need not extend axially along the wall of the ring, but instead can be normal to it. Otherwise stated, a plane cut normally through the bight and both arms lies along the wall, rather than normal to the wall.

Figure 6:
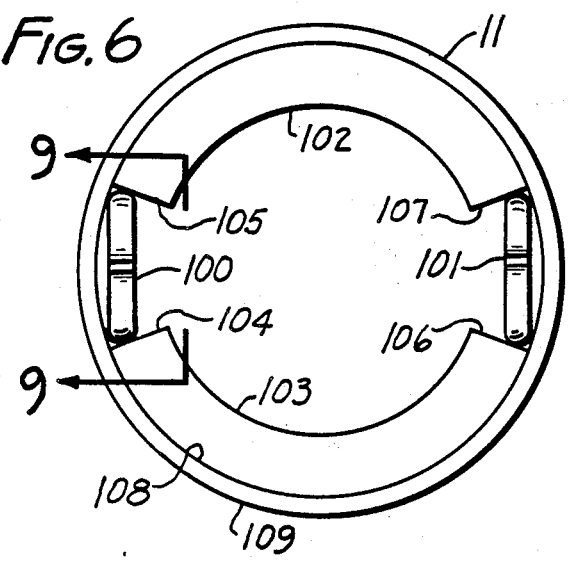
FIG. 6 is an end view showing another embodiment of the invention.

In FIG. 6, two retainer springs 100, 101 are shown interposed between magnets 102, 103, bearing against abutment faces 104, 105, 106 and 107. They also bear against the inside wall 108 of the steel ring 109. The detailed construction of these identical retainer springs is best shown in FIGS. 9-11.

In FIG. 9, spring 100 is shown with a central bight 110 and two arms 111, 111a. This spring is formed from wire or rod. As best shown in FIG. 11, it has generally rounded corners, and an outer straight face 112 (contact surface) that bears against the abutment surface. The initial shape of the spring is shown in FIG. 10, where the bight can be initially flat or rounded upward as previously shown. A flat bight is somewhat more advantageous, because when the anvils are pressed against it, it will tend to remain centered, rather than to drift to one side. However, a somewhat rounded or even peaked bight will perform satisfactorily. The legs are spread apart by a nominal distance which will enable the spring to be placed between the abutment surfaces with ease. Then the retainer spring is reworked between anvils in a limited portion of its working length, as previously described, to reverse the bow curvature and cause the arms to spread apart, take up the tolerances, and stress-load the bow. Tooling similar to that shown in FIGS. 15 and 16 can be used. the most advantageous technique is to form a reverse curve 113 in the bight as shown. Alternatively, the bight could have been made with an initial convex shape, and been flattened when the spring was reformed in place.

FIG. 12 shows a retention spring which is essentially a combination of two of the springs shown in FIGS. 9-11. It has a pair of bights 121, 122, and each bight connects a pair of arms as before. However, two of the arms are connected. The setting of this spring is identical to that of the embodiment of FIG. 9, except that two sets of tooling are used simultaneously.

Figure 17:
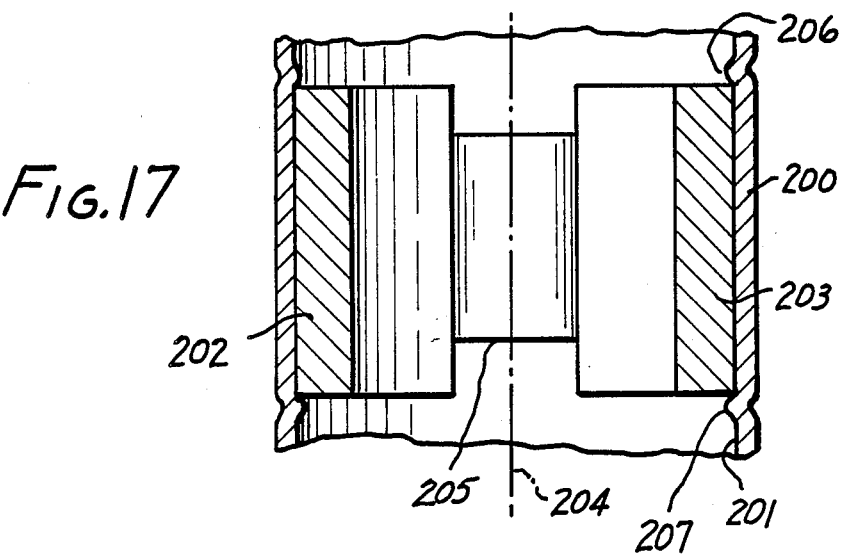
FIG. 17 is a fragmentary axial cross-section showing optical detents.

FIG. 17 shows additional means to secure the assembly against unusual shock loads which might be experienced in shipping or abnormal use. A tube 200 within inner wall 201 receives a pair of magnets 202, 203 as in the other embodiments. The tube has a central axis 204. A retention spring 205 according to any of the embodiments is installed between two magnets. Detents to restrict any vibrating or shock displacements of magnets, for example detents 206, 207 may be located on the inside wall of the tube. These may be metal, and may constitute raised stud-like structures, which can be located where either or both of the ends of the magnets are to be located. Any desired number of detents can be provided, and if preferred, the detents could instead be ring-like structures.

Figure 18:
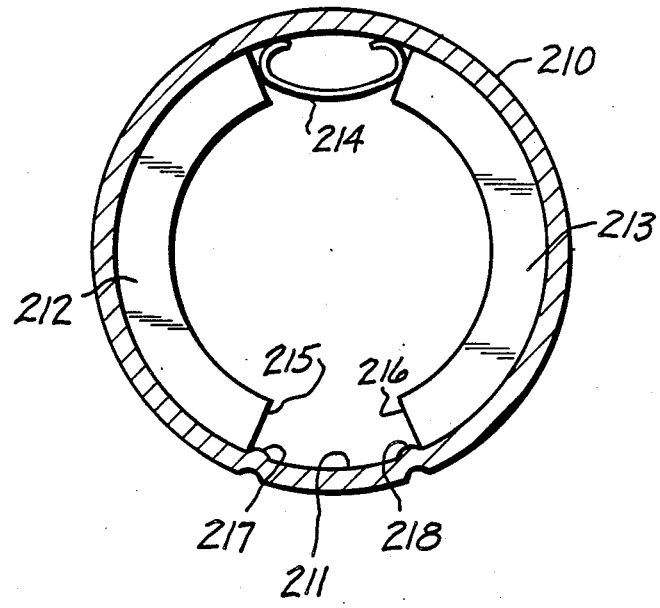
FIG. 18 is a fragmentary transverse cross-section showing other optional detents.

For some installations, it is sufficient to use only one retention spring. An example is shown in FIG. 18, where tube 210 with an inner wall 211 has magnets 212, 213 held in it by means of retention spring 214. Spring 214 can be according to any of the embodiments disclosed herein. The abutting surfaces 215, 216 away from spring 214 must, of course, be restrained. A spacer (not shown) could be placed in abutment with these surfaces, or instead detents 217, 218 may be formed on the inner wall to be borne against by the magnets. As in FIG. 17, the detents could be created by deformation of the metal by a force exerted on the outer wall of the tube.

In summary, in all embodiments, a retention spring is made from reformable resilient metal into a bow or a wave-type structure with arms at each end to contact and oppose abutment surfaces on articles to be retained. The spring has a bight with one or more apex portions at a location off of (above) the load contact points, and also above the ultimately reformed assembly height of the retention spring.

The installation procedure involves three sequential operations:

a. Reducing the height of the spring with the concomitant extension of the arms to take up assembly clearances. This may be accomplished initially by causing the arms to slide along a surface such as the inside wall of the ring, or solely by spreading the arms by reversing the curvature in a limited bight or apex portion of the spring.

b. Further reducing the height and/or reversing the bight curvature to provide a bowing deformation (which may be permanent) to spring-load the arms against the abutment surfaces. This is a continuation of step a, above, and can result in random bending of the arms, more closely controlled bending if the geometry is designed for it, or a curling of portions designed for the purpose, such as the fingers in FIGS. 1-5.

c. The final reworking of a limited apex region, which permanently deforms that region to change its curvature, and increase the bow curvature and stress in the arms.

It is further to be observed that, instead of retaining two articles with the use of the two retainer spring, each of the retainer springs bearing against two articles, one of the abutment surfaces could be on fixed structure instead and only one article retained. Furthermore, permanent detents can be used in lieu of one of the retention springs.

The term "intrinsic length" is sometimes used herein. This term is meant to describe what would be the length of the retention spring (i.e., the spacing between its contact points) absent restraint. This is not the first extension where the spring is deflected to take up the assembly clearances. Instead it is the consequence of the further bowing of the arms, and of the permanent reformation in the limited area in the bight. This intrinsic increase in length, is never actually realized by the spring retainer, because its extension is resisted by the abutment surfaces, causing the arms to become bowed and to store energy. Thus when the reworking forces are removed, the spring-back energy looses are limited to that relatively small portion of its working length which was reworked to reverse the bow curvature. The retainer is quickly and efficiently set in place with its ultimate configuration and maximum loading irrespective of varying assembly tolerances.

This invention is not to be limited by the embodiments shown in the drawings and described in the description, which are given by way of example and not of limitation, but only in accordance with the scope of the appended claims.

We claim:

1. A working spring retainer biasing a separate article to hold it in place against a separate concavely-curved wall in surface to surface contact therewith, said article having an abutment surface facing toward and being contacted by said spring retainer, said spring retainer also bearing against a second abutment surface, and comprising: a metal body having a pair of spaced-apart arms, each arm having a contact surface, whereby spaced-apart portions of each arm make contact with a respective abutment surface, and a bight connecting said arms, the metal of said body providing significant spring loading capacity, and permitting of permanent deformation, some part of said bight, after placement of said spring retainer between said abutment surfaces, having been permanently reformed by stress exerted in such a way as would, absent restraint by said abutment surfaces, enlarge the intrinsic length of said working spring retainer, the angle between said arms closer to said wall thereby being enlarged, and the spring retainer thereby storing additional energy which exerts a springing force against said abutment surfaces, said spring retainer, if removed from restraint, resiliently elongating to an intrinsic length longer than the distance between said abutment surfaces, which distance is greater than the length of said spring prior to said placement.

2. A working spring according to claim 1 in which said part constitutes a localized portion of said bight.

3. A working spring according to claim 2 in which said article has a curved surface, and is being biased by said spring to hold said article against sliding movement along said wall as a consequence of frictional resistance.

4. A working spring according to claim 3 in which said bight and arms have a substantial width, said contact surfaces being disposed near the face ends of said arms.

5. A working spring according to claim 4 in which said arms are curled adjacent to their ends.

6. A working spring according to claim 5 in which slots are formed in said curled portions to form fingers.

7. A working spring according to claim 3 in which a centering notch is formed at each edge of said bight.

8. A working spring according to claim 3 in which said contact surfaces are disposed on the arms at a location spaced from said free ends, and in which said bight and said arms are all adjacent to said wall.

9. A working spring according to claim 8 in which the curvature of said bight has been permanently changed by deformation of the material thereof.

10. A working spring according to claim 3 in which said bight is disposed on the opposite side of a line down between the points of contact with the abutment surfaces, from said wall.

11. In combination: at least one working spring according to claim 3, a rigid tubular ring having said curved wall, and a plurality of said curved articles, each bearing one of said abutment surfaces.

12. A combination according to claim 11 in which said bight and arms have a substantial width, said contact surfaces being disposed near the face ends of said arms.

13. A combination according to claim 11 in which said contact surfaces are disposed on the arms at a location spaced from said free ends, and in which said bight and said arms are all adjacent to said wall.

14. A retention spring according to claim 4 in which said arms are bent adjacent to their ends.

15. A retention spring according to claim 14 in which slots are formed in said bent portions to form fingers.

16. A working spring according to claim 1 in which the central portion of said bight after said permanent deformation is disposed on the side of a line drawn between the contacts of said arms with said abutment surfaces which is closer to the said article.

17. The method of installing a retention spring between two separate opposed abutment surfaces on separable articles so the spring exerts a separative force against said abutment surfaces, said surfaces being spaced apart by a spacing and lying adjacent to a wall, said retainer spring comprising a springy metal body having two arms with contact surfaces to bear against respective ones of said abutment surfaces, and a bight between and joining said arms which is substantially displaced from a line extending between said contact surfaces, and the distance between said contact surfaces being initially shorter than said spacing, said method comprising: loosely placing said retention spring between said abutment surfaces to accommodate tolerances of the separable articles, and as a further stage, pressing on said bight so as to extend the actual length of said retention spring to occupy said spacing, as a still further stage, pressing on said bight so as to enlarge the intrinsic length of said retention spring and thereby bow said arms, and as yet another stage permanently to reform some portion of said bight so as to change its curvature in a manner which will additionally increase said intrinsic length.

18. A method according to claim 17 in which the central portion of said bight after said permanent deformation is disposed on the side of a line drawn between the contacts of said arms with said abutment surfaces which is closer to the said article.

19. A method according to claim 17 in which said part constitutes a localized portion of said bight.

20. A method according to claim 19 in which the free ends of said arms are also pressed against said wall.

21. A method according to claim 19 in which said body initially has a convex apex in said limited portion, whose curvature is reduced in said reformation.

22. A method according to claim 19 in which said last mentioned stage is accomplished by pressing said limited portion in a tool having curved forming faces.

23. A method according to claim 19 in which the free ends of the arms are initially curled, whereby during said second mentioned stage they are additionally curled to take up tolerances.

24. A method according to claim 19 in which the free end of the arms are initially bent, whereby during said second mentioned stage they are additionally bent to take up tolerances.

* * * * *